US010472572B1

(12) United States Patent
Foret

(10) Patent No.: US 10,472,572 B1
(45) Date of Patent: Nov. 12, 2019

(54) METHOD AND APPARATUS FOR TREATING ORGANIC MATTER

(71) Applicant: Foret Plasma Labs, LLC, The Woodlands, TX (US)

(72) Inventor: Todd Foret, The Woodlands, TX (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 214 days.

(21) Appl. No.: 15/482,707

(22) Filed: Apr. 7, 2017

Related U.S. Application Data

(60) Provisional application No. 62/319,417, filed on Apr. 7, 2016.

(51) Int. Cl.
| *C10B 31/08* | (2006.01) |
| *B02C 18/22* | (2006.01) |
| *B02C 18/14* | (2006.01) |
| *B02C 19/18* | (2006.01) |
| *C10B 19/00* | (2006.01) |
| *C10B 53/02* | (2006.01) |
| *C10B 53/08* | (2006.01) |
| *C10B 31/02* | (2006.01) |
| *C10B 37/00* | (2006.01) |
| *B09B 3/00* | (2006.01) |

(52) U.S. Cl.
CPC ............ *C10B 31/08* (2013.01); *B02C 18/141* (2013.01); *B02C 18/2216* (2013.01); *B02C 18/2258* (2013.01); *B02C 19/186* (2013.01); *B09B 3/0083* (2013.01); *C10B 19/00* (2013.01); *C10B 31/02* (2013.01); *C10B 37/00* (2013.01); *C10B 53/02* (2013.01); *C10B 53/08* (2013.01)

(58) Field of Classification Search
CPC .... B02C 18/2216; B02C 19/186; C10B 31/08
See application file for complete search history.

(56) References Cited

U.S. PATENT DOCUMENTS

| 3,271,018 | A | 9/1966 | Kiln |
| 5,555,823 | A | 9/1996 | Davenport |
| 5,869,810 | A | 2/1999 | Reynolds et al. |
| 7,691,344 | B2 | 4/2010 | Yoshimura |
| 8,282,787 | B2 | 10/2012 | Tucker |
| 8,904,749 | B2 | 12/2014 | Foret |
| 9,445,488 | B2 | 9/2016 | Foret |
| 2014/0209573 | A1 | 7/2014 | Foret |

FOREIGN PATENT DOCUMENTS

WO 2013184074 A1 12/2013

*Primary Examiner* — James Sanders
(74) *Attorney, Agent, or Firm* — Daniel J. Chalker; Edwin S. Flores; Chalker Flores, LLP

(57) ABSTRACT

An apparatus includes a material feeder having an input and an output, a reducing nozzle attached to the output of the material feeder, an electrically conductive tube having a first end surrounding at least a portion of the reducing nozzle, and an induction coil surrounding all or part of the electrically conductive tube. A method for treating organic matter includes inductively heating the electrically conductive tube using the induction coil, and supplying the organic matter to the input of the material feeder. The organic matter is pushed through the reducing nozzle using the material feeder, such that the organic matter forms a continuous tube, semi-continuous tube or pellets of organic matter that is pushed through the electrically conductive tube. The continuous tube, semi-continuous tube or elongated pellets of organic matter is treated using the heat within the electrically conductive tube.

17 Claims, 11 Drawing Sheets

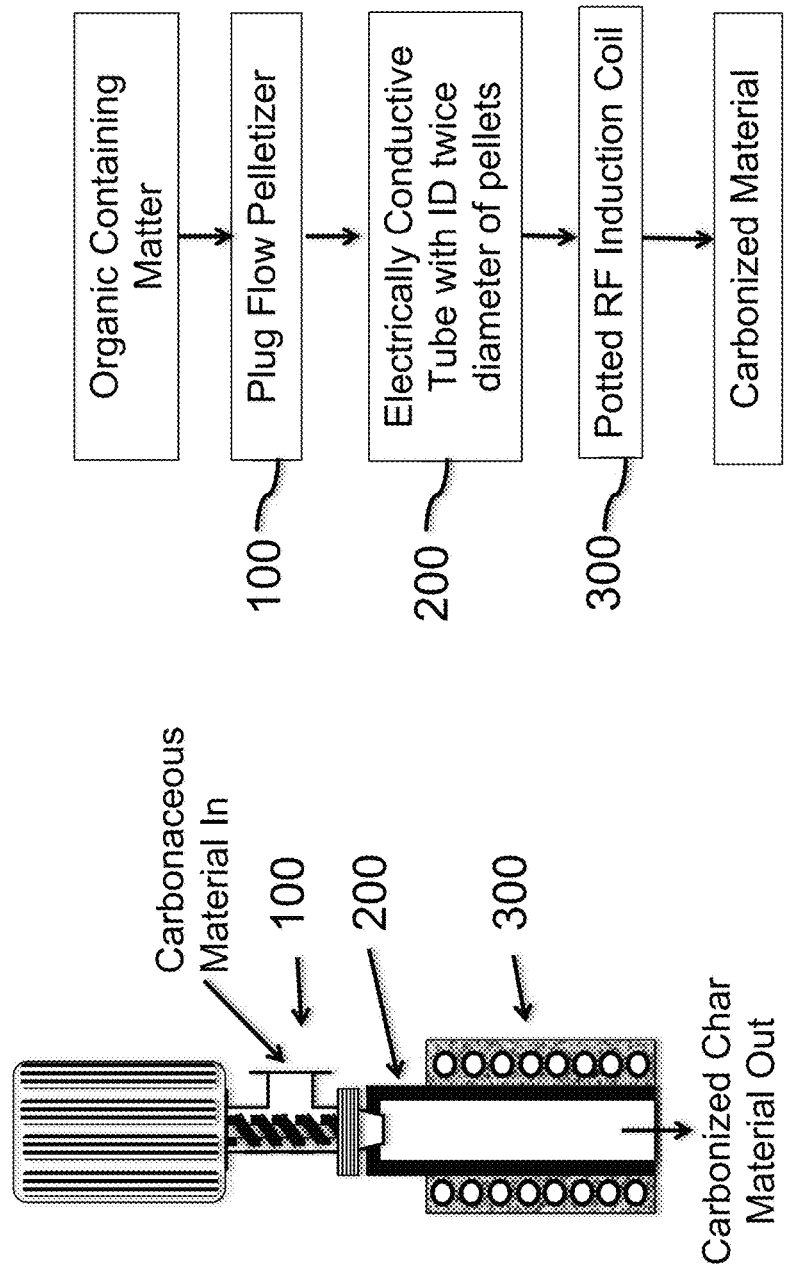

METHOD AND APPARATUS FOR TREATING ORGANIC MATTER

PRIORITY CLAIM AND CROSS-REFERENCE TO RELATED APPLICATIONS

This patent application claims priority to U.S. Provisional Patent Application Ser. No. 62/319,417 filed on Apr. 7, 2016, the entire contents of which are incorporated herein by reference.

FIELD OF THE INVENTION

The present invention relates to treating materials, and more specifically to a method and apparatus for treating organic matter.

BACKGROUND OF THE INVENTION

A current but unmet need for devices and methods to effectively and efficiently treat organic materials, such as leaves, branches, grass clippings, hog fuel, pins, planar shavings, bark, sawdust, wood chips solids, wastewater sludge, etc.

SUMMARY OF THE INVENTION

The present invention provides an induction heating and conversion system, method and apparatus that includes a plug flow screw feeder with a feed entry and a feed exit, a reducing cone attached to the screw feeder exit to produce plug flow, an electrically conductive tube with an inner bore greater in diameter then the exit of the reducing cone and positioned adjacent to the reducing cone to receive feed from the cone and a RF induction coil positioned for heating the electrically conductive tube with RF Energy.

The present invention provides an induction heating and conversion system, method and apparatus that includes a combined screw feeder, mixer and grinder with a feed entry and a feed exit, a reducing cone attached to the screw feeder exit, an electrically conductive tube with an inner bore greater in diameter then the exit of the reducing cone and positioned adjacent to the reducing cone to receive feed from the cone and a RF induction coil positioned for heating the electrically conductive tube with RF Energy.

The present invention provides an induction heating and conversion system, method and apparatus that includes a ram feeder with a feed entry and a feed exit, a reducing cone attached to the screw feeder exit, an electrically conductive tube with an inner bore greater in diameter then the exit of the reducing cone and positioned adjacent to the reducing cone to receive feed from the cone and a RF induction coil positioned for heating the electrically conductive tube with RF Energy.

The present invention provides an induction heating and conversion system, method and apparatus that includes a screw feeder with a feed entry and a feed exit, a reducing cone attached to the screw feeder exit, an electrically conductive tube with an inner bore greater in diameter then the exit of the reducing cone and positioned adjacent to the reducing cone to receive feed from the cone, a RF induction coil positioned for heating the electrical conductive tube with RF Energy and a thru-bore rotation means for holding the electrical conductive tube and allowing it to rotate.

The present invention provides an induction heating and conversion system, method and apparatus that includes a screw feeder with a feed entry and a feed exit, a reducing cone attached to the screw feeder exit, an electrically conductive tube with an inner bore greater in diameter then the exit of the reducing cone and positioned adjacent to the reducing cone to receive feed from the cone, a RF induction coil positioned for heating the electrical conductive tube with RF Energy, a thru-bore rotation means for holding the electrical conductive tube and allowing it to rotate and a second source for heating the feed material.

The present invention provides an induction heating and conversion system, method and apparatus that includes a screw feeder with a feed entry and a feed exit, an electrically conductive susceptor positioned adjacent to the screw feeder, a potted RF induction coil positioned for heating the electrical conductive susceptor with RF Energy and a linear actuator attached to the susceptor for providing movement along the longitudinal axis of the system.

The present invention provides an induction heating and conversion system, method and apparatus that includes a screw feeder with a feed entry and a feed exit, a reducing means, an electrically conductive susceptor positioned adjacent to the screw feeder, a potted RF induction coil positioned for heating the electrically conductive susceptor and the reducing means with RF Energy, and a linear actuator attached to the susceptor for providing movement along the longitudinal axis of the system for providing the reducing means as feed material exits the screw feeder.

The present invention provides a method for treating an organic matter using a material feeder having an input and an output, a reducing nozzle attached to the output of the material feeder, an electrically conductive tube having a first end surrounding at least a portion of the reducing nozzle, and an induction coil surrounding all or part of the electrically conductive tube. The electrically conductive tube is inductively heated using the induction coil, and the organic matter is supplied to the input of the material feeder. The organic matter is pushed through the reducing nozzle using the material feeder, such that the organic matter forms a continuous tube, semi-continuous tube or pellets of organic matter that is pushed through the electrically conductive tube. The continuous tube, semi-continuous tube or elongated pellets of organic matter is treated using the heat within the electrically conductive tube.

The present invention provides an apparatus for treating an organic matter that includes a material feeder, a reducing nozzle, an electrically conductive tube and an induction coil. The material feeder has an input and an output. The reducing nozzle is attached to the output of the material feeder. The electrically conductive tube has a first end surrounding at least a portion of the reducing nozzle, and a second end. The induction coil surrounds all or part of the electrically conductive tube.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIG. 10 is a cross-sectional view of a plug flow induction carbonization system accordance with one embodiment of the present invention;

FIG. 11 is a flow chart of a method to carbonize organic matter in accordance with one embodiment of the present invention.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention relates to a plug flow feeder grinder solids handling system synergistically coupled to an induction heater for pelletizing and heating, cooking or carbonizing organic matter with induction heat. More specifically, the present invention relates to a push in grind out induction heating system, method and apparatus for heating, treating and/or converting material from a lower value material to a higher value material in particular carbonizing an organic compound. Furthermore, the present invention relates to a feeder grinder induction system for conveying and treating a material in a first induction step and then feeding material into a second induction treatment step. In addition, the present invention relates to an induction heater and feeder for pelletizing carbonaceous material and converting in part the pellet into an electrically conductive char for further carbonization via direct heating the charred pellets with an RF induction coil. Likewise, the present invention relates to a carbon sequestration method using a pelletizer and an induction heated susceptor to convert biomass into biochar. In addition, the present invention relates to an induction rotary cooking system.

An organic compound, matter or material in accordance with the present invention means a compound that contains carbon including carbonates.

Carbonized material in accordance with the present invention means a material that has been converted to char, biochar, solid carbon, carbon residue, graphite and/or graphene.

Carbonization in accordance with the present invention means to convert or partially convert an organic compound into carbon or a carbon-containing residue via pyrolysis.

Calcination in accordance with the present invention means to convert carbonates to oxides via high temperature by removing carbon dioxide in either an oxidizing or reducing atmosphere.

Pyrolysis in accordance with the present invention means a thermochemical decomposition of organic material at elevated temperatures in a reducing atmosphere (partial oxidation or non-oxidizing atmosphere). It involves the simultaneous change of chemical composition and physical phase, and is irreversible.

Plug flow in accordance with the present invention means forming a pellet plug within a tube or holes within a plate such that gases on the outlet side of the tube or holes cannot back flow through the tube or holes.

Figure 1:
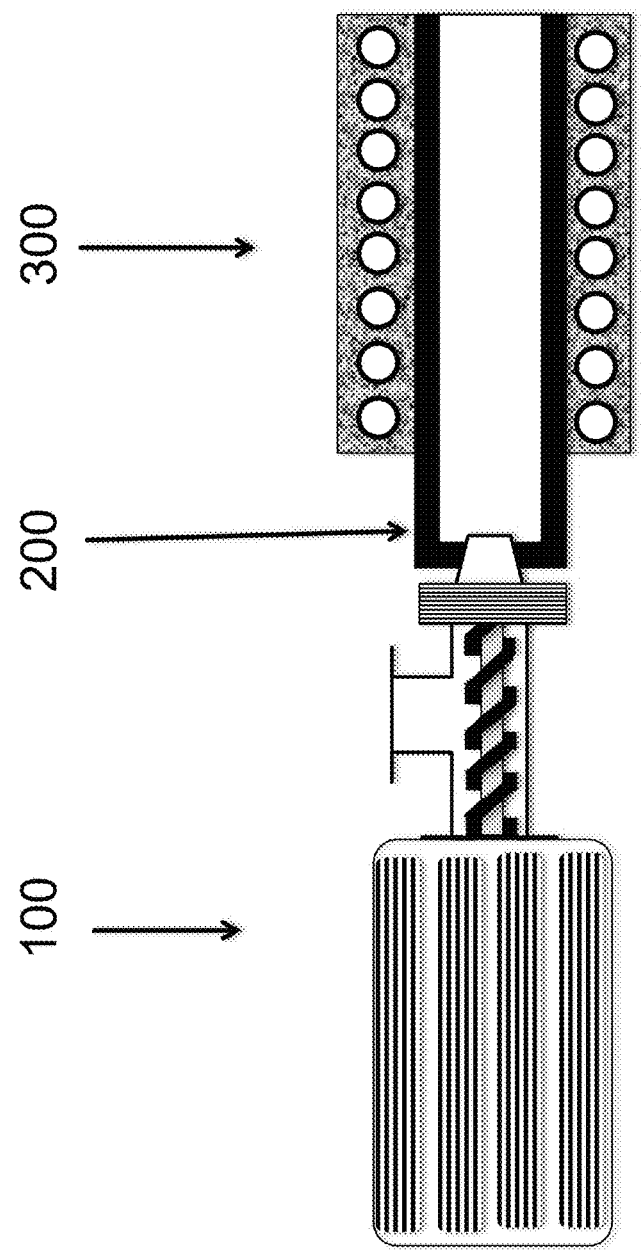
FIG. 1 is a cross-sectional view of a plug flow feeder grinder induction heater in accordance with one embodiment of the present invention.
Figure 2:
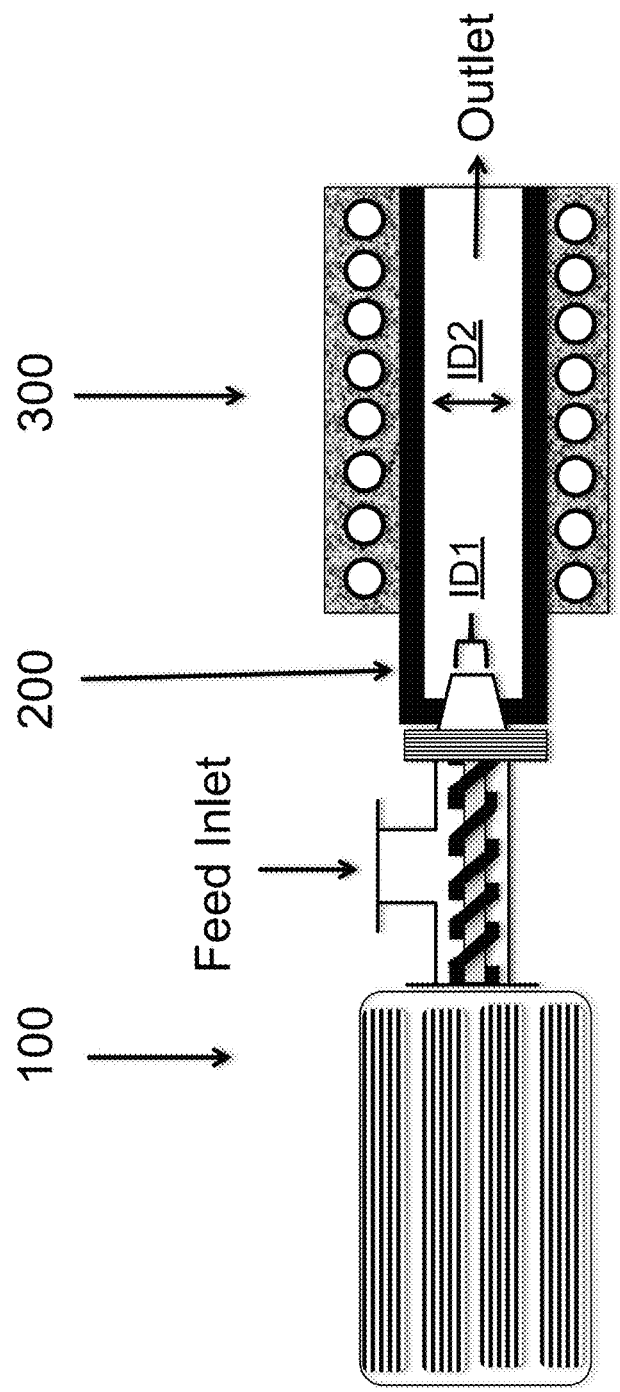
FIG. 2 is a cross-sectional view comparing and contrasting the feeder grinder tube inside diameter to the induction heated tube inside diameter in accordance with one embodiment of the present invention.

Now referring to FIG. 1, a feeder grinder 100 for example a meat grinder is coupled to an electrically conductive tube 200 commonly referred to as a susceptor when it is heated by an induction coil 300. FIG. 2 shows the feed inlet of the feeder grinder 100 and the outlet of the combined susceptor 200 and induction coil 300.

Prior to testing the apparatus as shown in FIG. 1 and FIG. 2 with various materials ranging from wastewater treatment plant sludge to petcoke, a similar apparatus was configured but the feeder grinder 100 fed material into a standard screw feeder. The screw feeder was heated with an induction coil. Temperature on the stainless steel tube was held below 1,000° C. The burst pressure for the stainless steel tube is rated at 4,100 psig. Indeed the tube busted while being heated and fed using only a ¼ hp electric screw feeder.

Not being bound by theory it is believed that as the water in the sludge heated and evaporated into steam it generated sufficient excess pressure to split the stainless steel tube. Consequently, a 2nd apparatus was tested using a perforated stainless steel tube, more commonly referred to as a well screen attached directly to the feeder grinder 100. The screen was used in order to allow for expansion pressure when water is heated and converted to steam. Although this device dried the sludge in part, it plugged up and a ship type auger had to be inserted into the outlet to drill out the dried material.

Figure 3:
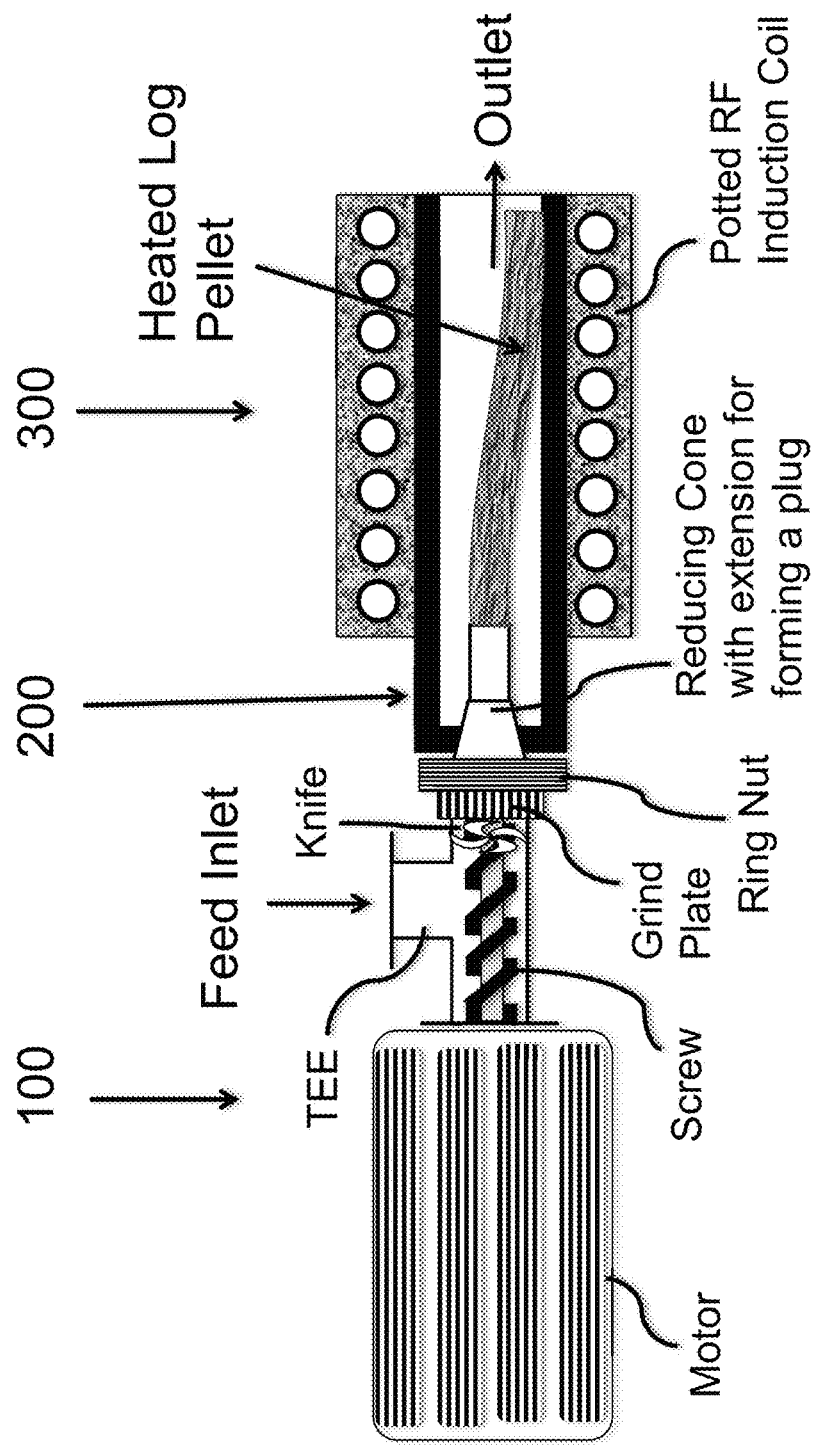
FIG. 3 is a cross-sectional view of a plug flow feeder grinder induction heater showing a heated log pellet in accordance with one embodiment of the present invention.

A sausage stuffing tube with an inside diameter of 0.75" was added to the meat feeder grinder as shown in FIGS. 1 and 2. A graphite tube with an inside diameter of 1.5" was attached to the meat grinder as shown in FIGS. 1 and 2. What occurred next was completely unexpected. The induction power supply was turned on and the induction coil 300 heated the graphite tube 200 to red hot. However, prior to feeding material into the meat feeder grinder 100, the power supply shut off due to a low water flow error. Wastewater sludge was fed into the grinder 100 and through the cone (sausage stuffing tube) in which it traversed the entire length of the graphite tube without plugging, sticking nor bridging in any manner. The sludge contained copious amounts of short paper fibers. The fibers rapidly carbonized and formed a long hot carbonized log pellet as shown in FIG. 3.

In all previous configurations the material fell apart after forming about a 2" long pellet. However, the system, method and apparatus as shown in the present invention produced a continuous log that extended past the outlet of the graphite tube 200. This was completely unexpected and very different from standard hot extruders and pelletizers commonly found in industry.

Pelletizers and extruders do not carbonize material. The present invention carbonized all the fibers that were in contact with the graphite tube. Consequently, this gives rise to an unobvious and novel method for manufacturing biochar in a single step. Since carbon is electrically conductive, then the partially carbonized log can be fed directly into a 2nd potted coil (not shown). Not being bound by theory it is believed that the carbonized material will continue to heat and convert to electrically conductive graphite. In turn, this will allow for heating the biochar log using all 3 forms of heat transfer—convection, conduction and radiation.

Figure 4:
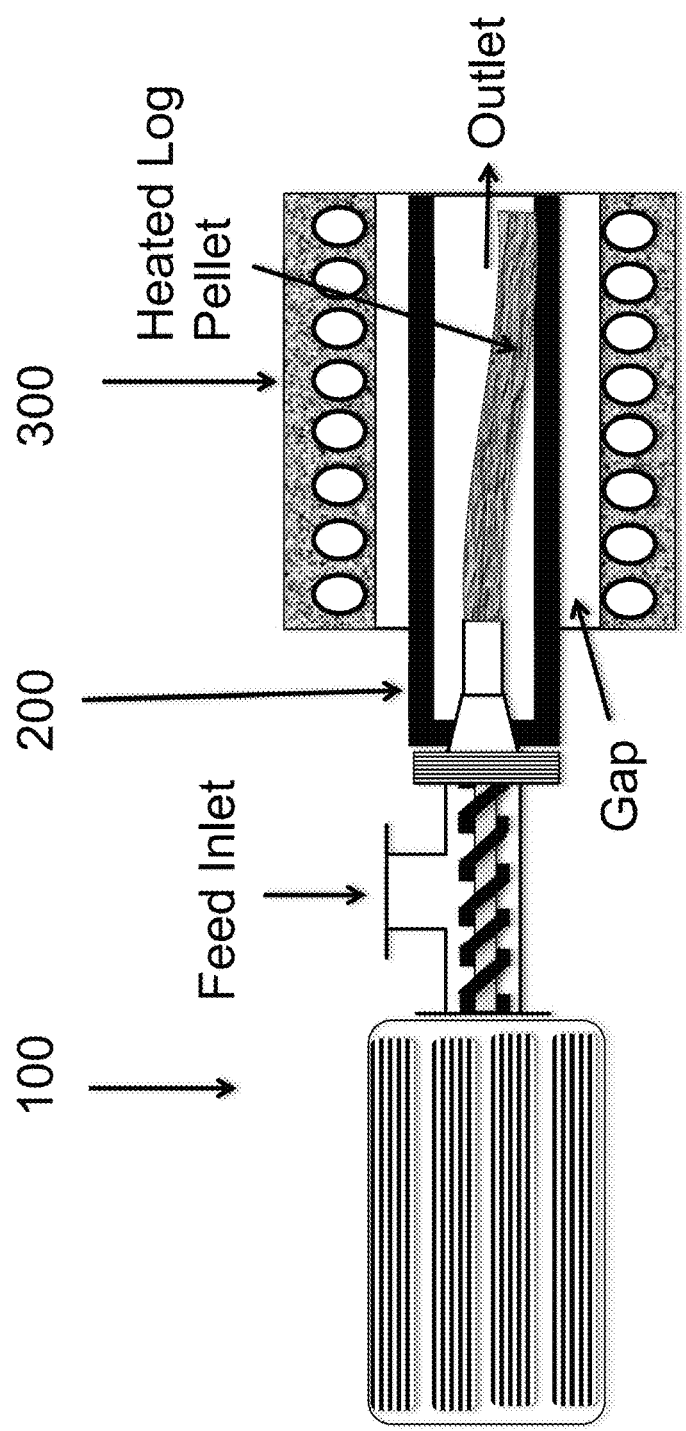
FIG. 4 is a cross-sectional view of a plug flow feeder grinder induction heater in accordance with another embodiment of the present invention.

Turning now to FIG. 4, the potted coil 300 may be fabricated such that a gap is formed between the susceptor 200 and the potted coil 300. This system allows for two different methods for further treating the sludge. The first method is flowing a gas down the gap. The gas will be heated by the hot susceptor. This method and configuration allows for operating the system as an induction heated annulus venture. The hot gas will further treat the log pellet.

Figure 5:
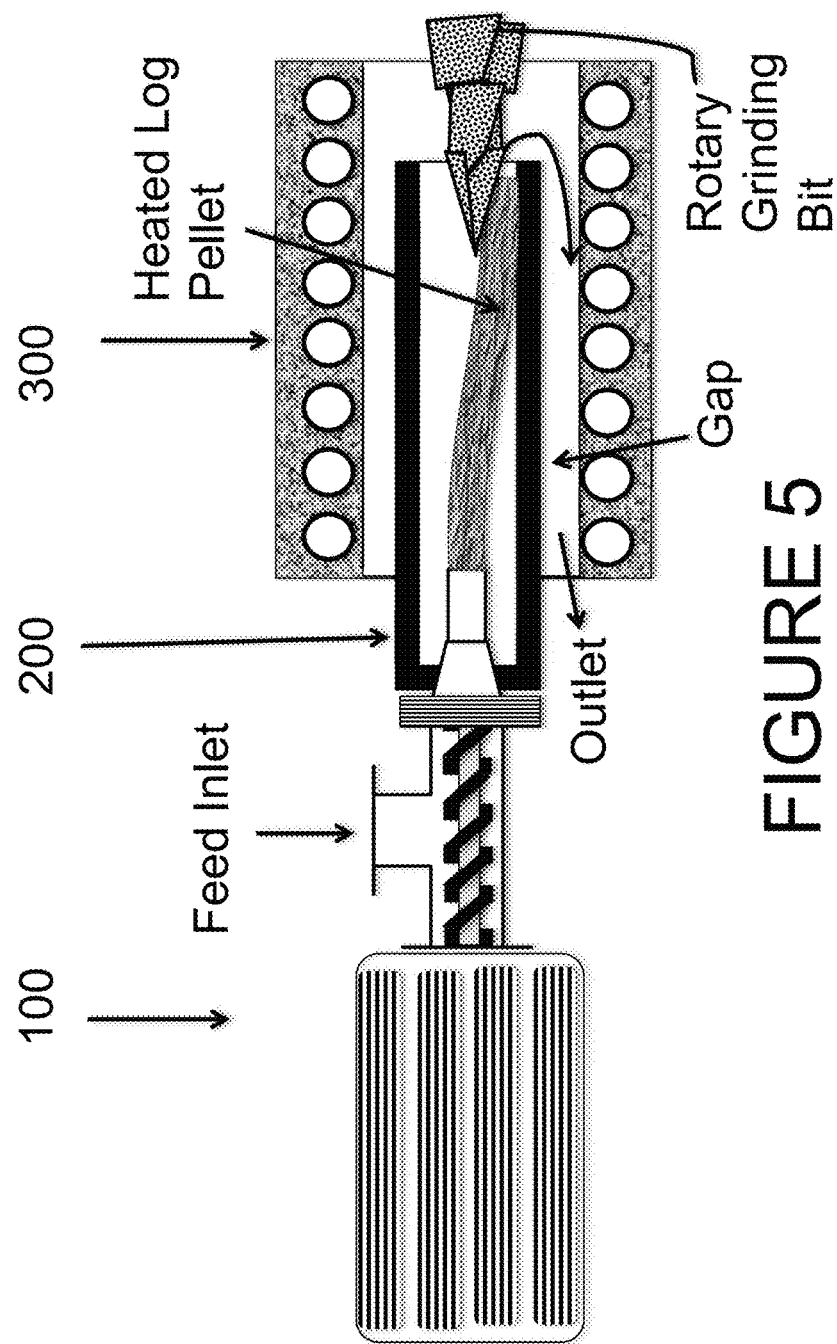
FIG. 5 is a cross-sectional view of a plug flow feeder grinder induction heater with backflow in accordance with another embodiment of the present invention.

Referring to FIG. 5, the second gap method is backflowing the log pellet by feeding it into the annulus/gap and let it flow back towards the feeder/grinder 100. Since the susceptor will be hotter on the outside due to the skin effect, then this method allows for heating the log pellet to a higher temperature. A grinder bit or any means for grinding and reverse flowing material down the annulus may be attached to the system in order to assist in conveying material within the annulus.

Figure 6:
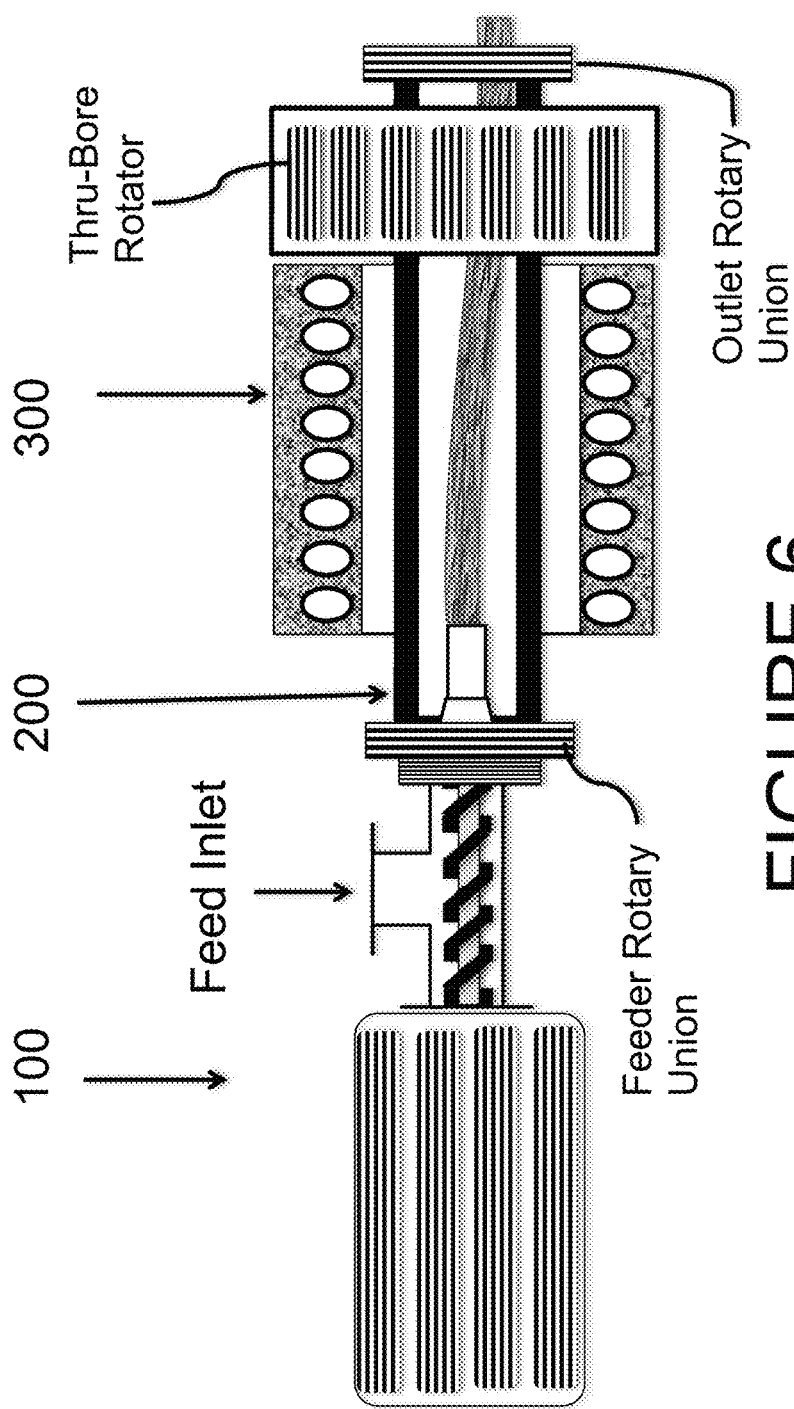
FIG. 6 is a cross-sectional view of a plug flow feeder grinder induction heater rotary kiln in accordance with another embodiment of the present invention.

Referring to FIG. 6, the electrically conductive susceptor 200 may be rotated using a thru-bore rotator means. Two commonly available thru-bore rotators are welding positioners and pipe threaders. Hence, the system, method and apparatus shown in FIG. 5 can be attached to a vessel or 2nd heating device by simply attaching the tube 200 to the feeder 100 using a feeder rotary union and attached to the vessel via 2nd outlet rotary union. Likewise, material can be backfed into the annulus by perforating the tube such that material falls into the gap. Thus, hot gases would continue down the rotary tube kiln and into a separation vessel such as a cyclone separator via the outlet rotary union.

By utilizing a thru-bore tube rotator several solids handling problems are solved with one device. First, alignment of a screw within a tube and utilizing a final hanger bearing requires extensive engineering and fabrication. Likewise, proper leveling a rotary kiln with multiple bearings and rotating the kiln with multiple motors leads to a construction project and not a simple solids handler that can be attached to for example to a rotary kiln or vertical gasifier.

Figure 7:
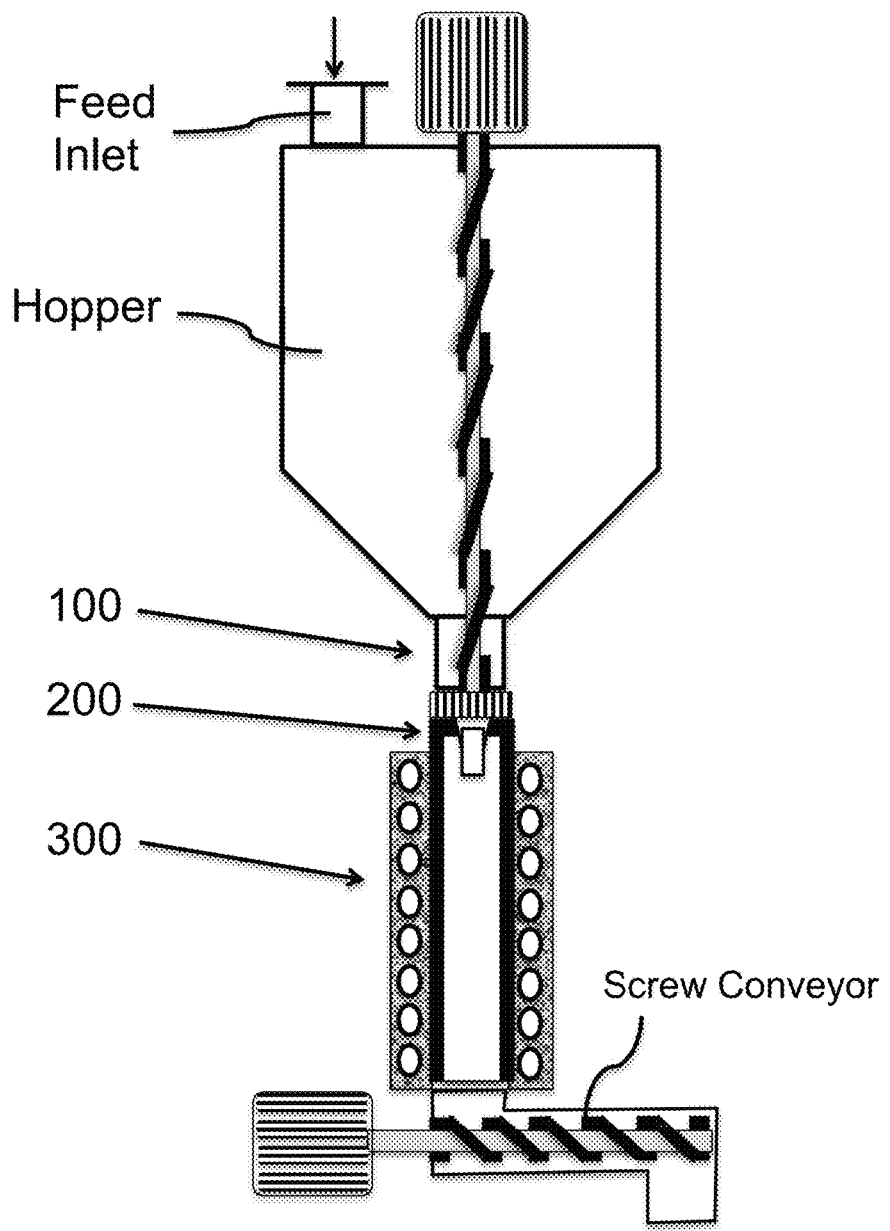
FIG. 7 is a cross-sectional view of a vertical hopper plug flow feeder grinder induction heater in accordance with another embodiment of the present invention.
Figure 8:
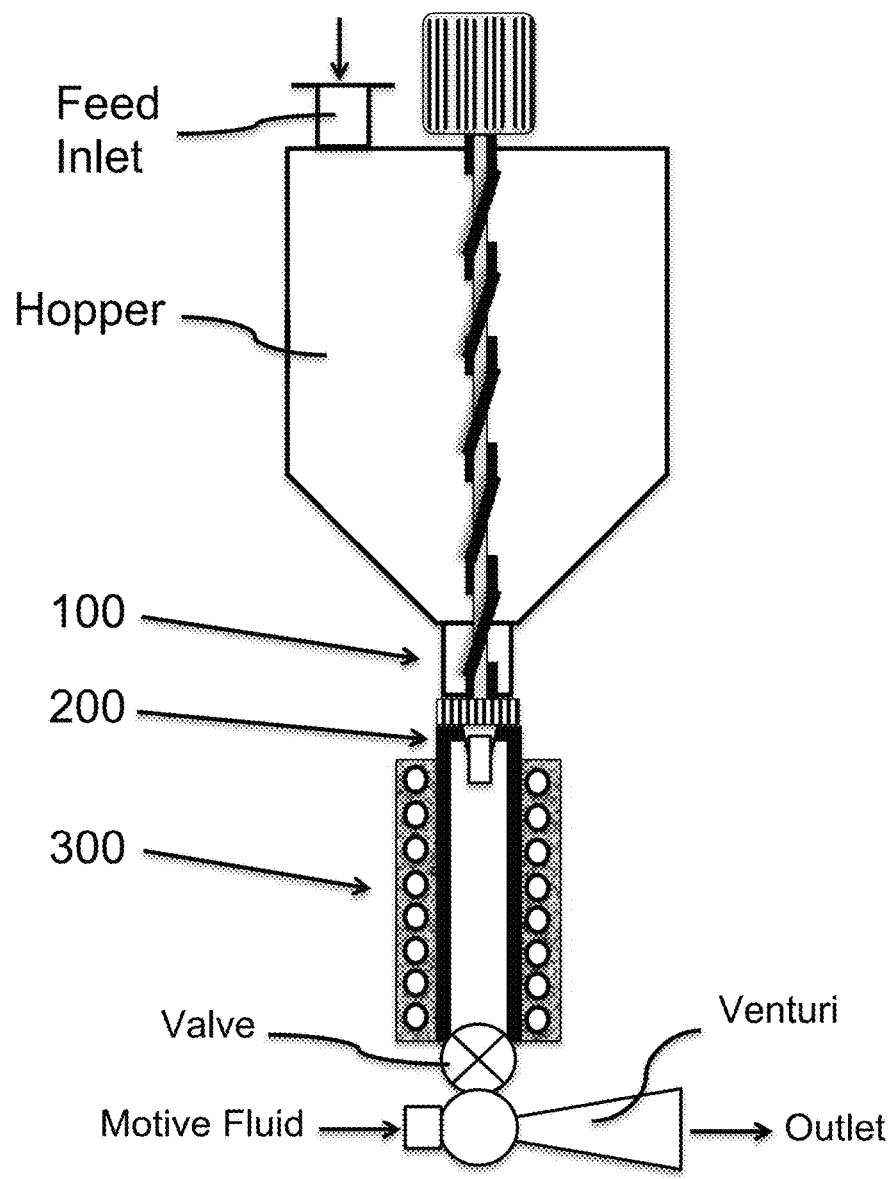
FIG. 8 is a cross-sectional view of a vertical hopper plug flow feeder grinder induction heater venturi in accordance with another embodiment of the present invention.

Many plants will not have sufficient floor space footprint to allow for a horizontal system. Consequently, FIGS. 7 and 8 disclose vertical hoppers in which the feed screw, grind plate and grinder blade of the meat grinder 100 are installed in the bottom of a hopper. Quite simply a meat grinder 100 can be disassembled and in part welded or attached to the bottom of the hopper. This configuration allows for plug flow in a downward flow position and into a pressurized reactor for example a gasifier (not shown). Thus, the downward feeder grinder with a sausage stuffing tube and induction coil is a novel and unobvious system, method and apparatus for solids handling in particular feeding into a high pressure reactor. The sausage stuffing tube forms a plug, which high pressure gases cannot backflow back into the hopper.

Returning back to FIG. 7 residence time can be increased by adding a screw feeder on the bottom of the susceptor 200 and coil 300. On the other hand, if residence time is not an issue, then a venturi can be used, which allows for flash and/or spray drying or feeding into a pressurized reactor.

Figure 9:
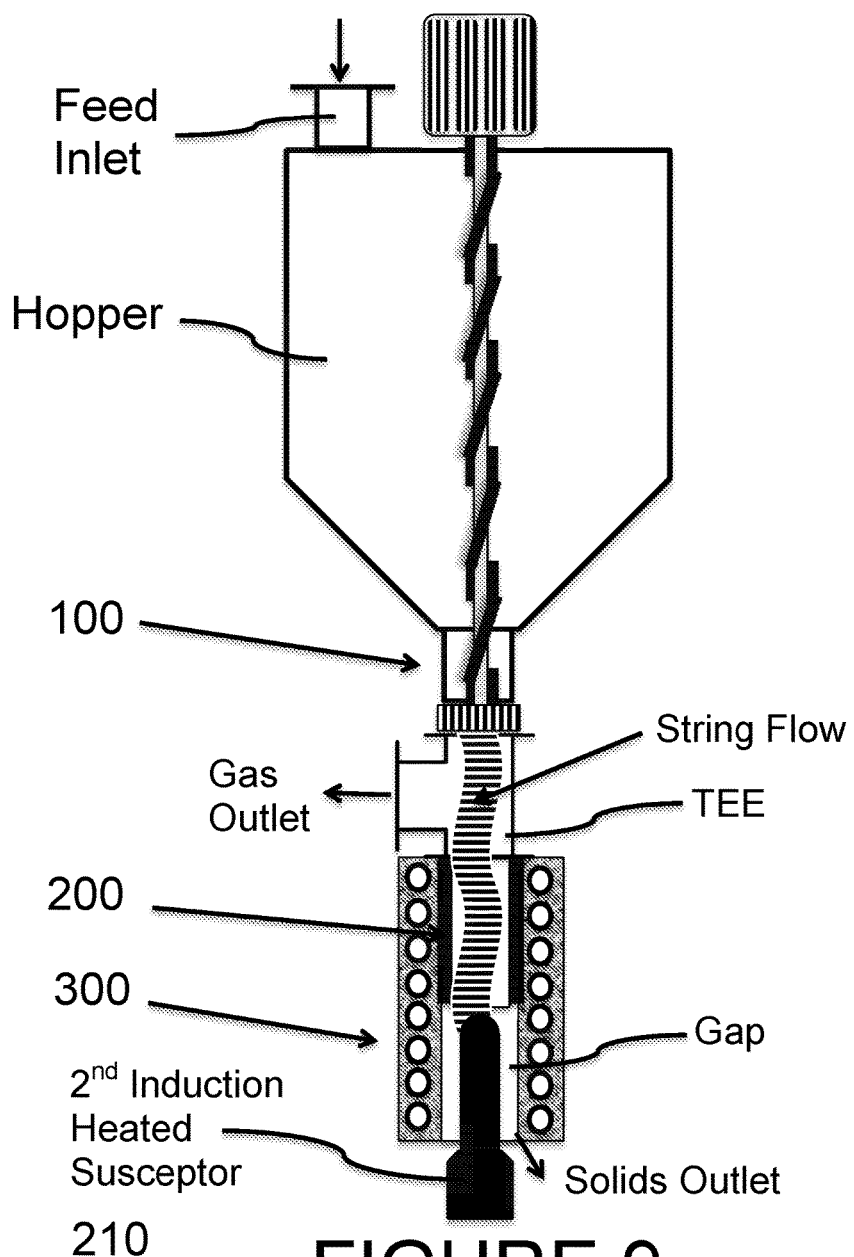
FIG. 9 is a cross-sectional view of a vertical hopper plug flow feeder grinder induction heater with string flow and a second induction heated susceptor in accordance with another embodiment of the present invention.

FIG. 9 discloses a vertical hopper plug flow feeder grinder without the reducing cone as disclosed in FIGS. 2 thru 8. In lieu of producing a sausage log as disclosed in FIGS. 1 thru 8, FIG. 9 produces string flow. Wastewater sludge with paper fiber was fed through a standard meat grinder without a cone and it produced long strings of spaghetti like material very similar to ground meat. However, when operated in a horizontal position the string balls up and does not traverse down a pipe. Thus, operating in a vertical position allows for the string to hang down and rapidly heat up. By adding a graphite electrode susceptor through the bottom of the apparatus disclosed in FIG. 9 this forms a 2nd induction heated zone. Thus, as the biomass spaghetti traverses through the first heated susceptor 200, it is further heated in the gap between the potted induction coil 300 and the graphite electrode 210. In addition, as the organic carbon within the waste begins to carbonize it will convert to electrically conductive char. Consequently, the electrically conductive biochar will absorb the RF energy from the induction coil 300 and rapidly heat up, thus fully converting all of the organic carbon to graphite via pyrolysis.

The following example will describe the dual heating mode of operation for the system, method and apparatus of the present invention.

Dual Mode Induction and Radiant Heating Example

A quick discussion of black body radiation will help in understanding the novelty and unobvious of the present invention. The purpose for using a susceptor with a high melting or sublimation point such as carbon, graphite or silicon carbide is two fold. First, the susceptor heats up due to induction heating. Induction heating is a form of non-contact heating. Thus, there are no electrical leads attached to the heater (susceptor). As the susceptor increases in temperature it emits ElectroMagnetic Radiation ("EMR"). As the temperature of the susceptor further increases then in accordance with the Stefan-Boltzman Equation the watts radiated from the object (susceptor) depends on the absolute temperature of the radiating surface to the fourth power. This means that a small increase in the temperature will produce a large increase in the radiated watts.

Temperature is the driving force in radiant heating applications. The Stefan-Boltzman Equation is the heart of the formula used to calculate radiant energy transferred from the heater (susceptor) to the product.

The Stefan-Boltzman Equation

All objects with a temperature above absolute zero radiate energy. The hotter the object, the greater the amount of energy radiated in a given time period (Power=Energy/Time). The Stefan-Boltzman equation calculates the amount of power (watts) radiated by a blackbody surface at temperature T.

$$\text{Watts/Area} = \text{constant} \times (\text{Absolute } T)^4$$

Power Density Example

Power density (or volume power density or volume specific power) is the amount of power (time rate of energy transfer) per unit volume. The reason for using graphite or a high temperature material is simple—high power density.

At the heart of the present invention is a plug flow feeder grinder power dense heater that synergistically combines both induction and radiant heat. The rapid heating of the material is due to the power density achieved by the design of the system, method and apparatus of the present invention. For example, referring to FIGS. 5 and 9 flowing material on or very near the outer surface of the susceptor exposes the material to the maximum radiant energy output of the heater (susceptor) and not just heating via conduction (contact between the material and the hot susceptor).

This is so because the outer surface or skin of the susceptor will be heated first and faster by induction. The efficiency of the system may be further increased by flowing the material inside the graphite tube susceptor then in the gap of FIG. 5. This configuration allows for a dual pass system. Likewise, utilizing a coil potted in a high EMR reflective ceramic allows for reflecting radiated energy from the susceptor back into the gap.

However, flowing material internally within a graphite tube achieves several benefits. First, material does not stick to graphite. This is why a long log was produced without the material balling up as in previous tests with a stainless steel tube. Second, as the graphite tube heats up and emits radiation internally, since graphite is a black body radiator it will continuously re-emit the radiation. In addition, since EMR travels in a straight line, then the EMR emitted from the tube will converge to a point in the center of the tube. Radiant energy will then be maximized at the vertex point. Thus, by operating in a vertical position as disclosed in FIG. 8 the power density of the system will be maximized along the centerline of the longitudinal axis. Hence, the use of a sausage stuffing tube—to produce plug flow so gases do not back flow into the feeder grinder and to center the material near the radiant vertex lines within the tube.

Figure 12:
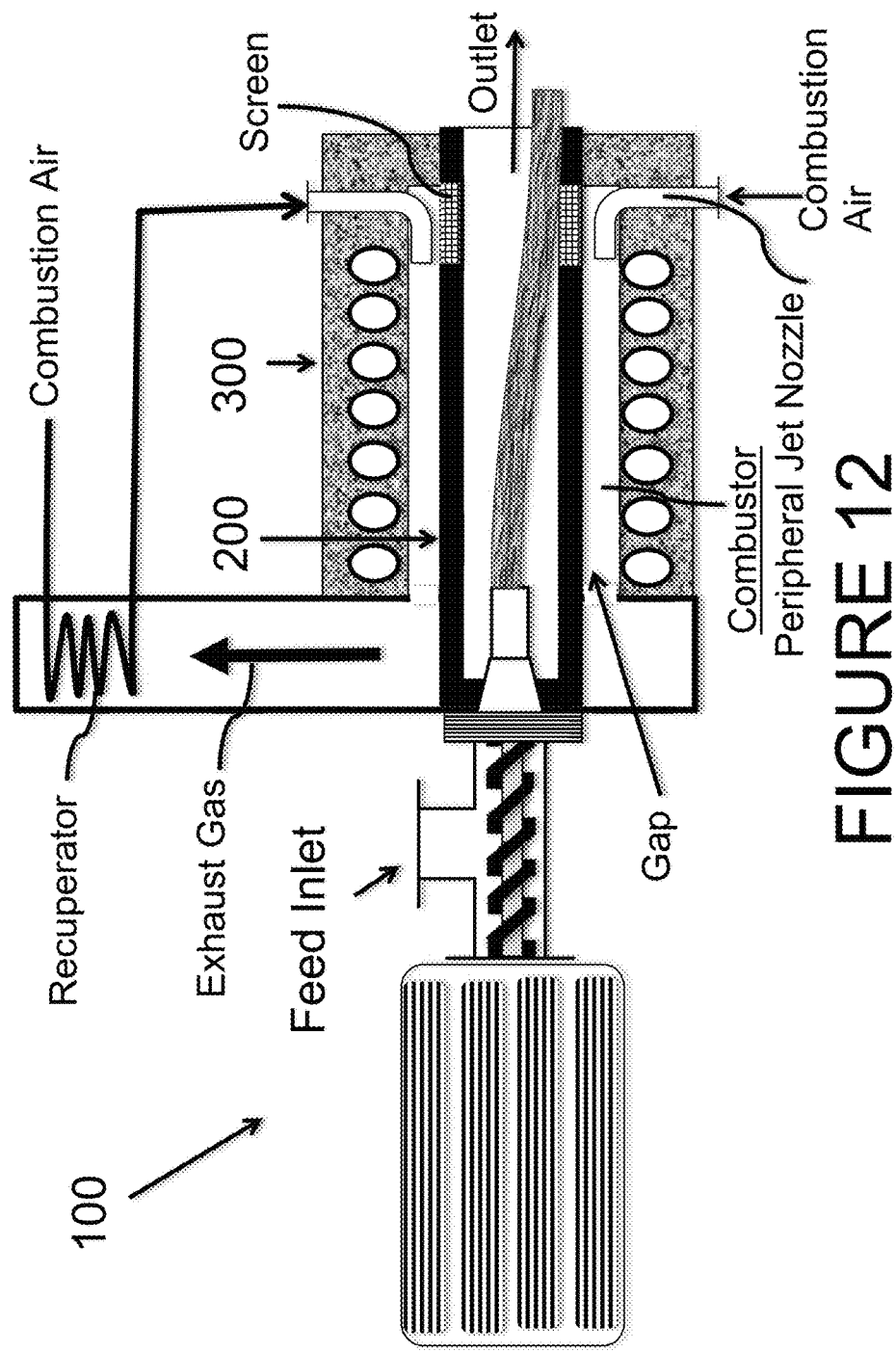
FIG. 12 is a cross-section view of an induction pyrolysis combustor/recuperator in accordance with another embodiment of the present invention.

Referring to FIG. 12, which may be operated in a vertical, horizontal or sloped position, the gap between the susceptor 200 and potted induction coil 300 is a combustor when air is introduced into the gap. This dramatically increases efficiency by combusting the pyrolysis gases typically referred to as syngas within the combustor gap which then heats the susceptor tube. In order to prevent solids from entering into the combustor gap a screen is coupled to the susceptor and outlet. In addition, to ensure pyrolysis gases flow into the combustor peripheral jet nozzles create a venturi effect and draw pyrolysis gases from the inside of the susceptor tube into the combustor gap. A recuperator is added to the exhaust to preheat the combustion air. The system, method and apparatus of FIG. 12 allows for reducing electrical input into the RF Induction Coil.

It is well known and well understood that hydrogen will combust in a partial vacuum. Consequently, in lieu of using an air blower or compressor the air may be drawn into the venturi nozzles by drawing a vacuum on the exhaust gases by condensing the steam produced from combustion of hydrogen and oxygen (air). In part the recuperator will suffice, however, a wasteheat boiler or condensing turbine may be added on the exhaust stack of the apparatus shown in FIG. 12.

A system, method and apparatus has been clearly disclosed that allows for feeding into a pressurized and/or vacuum system while also preheating, treating or converting the material into a higher value product.

The foregoing description of the apparatus and methods of the invention in preferred and alternative embodiments and variations, and the foregoing examples of processes for which the invention may be beneficially used, are intended to be illustrative and not for purpose of limitation. The invention is susceptible to still further variations and alternative embodiments within the full scope of the invention, recited in the following claims.

The invention claimed is:

1. A method for treating an organic matter comprising:
providing a material feeder having an input and an output, a reducing nozzle attached to the output of the material feeder, an electrically conductive tube having a first end surrounding at least a portion of the reducing nozzle, and an induction coil surrounding all or part of the electrically conductive tube;
inductively heating the electrically conductive tube using the induction coil;
supplying the organic matter to the input of the material feeder;
pushing the organic matter through the reducing nozzle using the material feeder, such that the organic matter forms a continuous tube, semi-continuous tube or pellets of organic matter that is pushed through the electrically conductive tube; and
treating the continuous tube, semi-continuous tube or elongated pellets of organic matter using the heat within the electrically conductive tube;
wherein an inner diameter of the reducing nozzle is approximately 50% or less than an inner diameter of the electrically conductive tube.

2. The method as recited in claim 1, further comprising grinding the organic material using a grinder, wherein the grinder is connected to the input of the material feeder, integrated into the material feeder or disposed between the output of the material feeder and the reducing nozzle.

3. The method as recited in claim 1, further comprising grinding the continuous tube, semi-continuous tube or elongated pellets of organic matter using a grinding bit at least partially disposed within a second end of the electrically conductive tube.

4. The method as recited in claim 1, wherein:
the electrically conductive tube comprises a graphite tube; and
the material feeder comprises a screw feeder, a ram feeder, a pelletizer.

5. The method as recited in claim 1, wherein the input of the electrically conductive tube is connected to the reducing nozzle or the material feeder with an adapter.

6. The method as recited in claim 1, further comprising an extension tube connected to the reducing nozzle.

7. An apparatus for treating an organic matter comprising:
a material feeder having an input and an output;
a reducing nozzle attached to the output of the material feeder;
an electrically conductive tube having a first end surrounding at least a portion of the reducing nozzle, and a second end; and
an induction coil surrounding all or part of the electrically conductive tube;
wherein an inner diameter of the reducing nozzle is approximately 50% or less than an inner diameter of the electrically conductive tube.

8. The apparatus as recited in claim 7, further comprising a grinder connected to the input of the screw feeder, integrated into the screw feeder or disposed between the output of the screw feeder and the reducing nozzle.

9. The apparatus as recited in claim 7, wherein:
the electrically conductive tube comprises a graphite tube; and
the material feeder comprises a screw feeder, a ram feeder, a pelletizer.

10. The apparatus as recited in claim 7, further comprising an adapter connecting the input of the electrically conductive tube to the reducing nozzle or the material feeder.

11. The apparatus as recited in claim 7, further comprising an extension tube connected to the reducing nozzle.

12. The apparatus as recited in claim 7, further comprising a gap disposed between an exterior of the electrically conductive tube and the induction coil.

13. The apparatus as recited in claim 7, further comprising a grinding bit at least partially disposed within the second end of the electrically conductive tube.

14. The apparatus as recited in claim 7, wherein the electrically conductive tube is in a horizontal position, a sloped position or a vertical position.

15. The apparatus as recited in claim 7, wherein the electrically conductive tube rotates along a longitudinal axis.

16. The apparatus as recited in claim 7, further comprising a susceptor partially disposed within the second end of the electrically conductive tube and aligned with a longitudinal axis of the of electrically conductive tube.

17. The apparatus as recited in claim 7, further comprising a screw conveyor, and eductor or reactor connected to the second end of the electrically conductive tube.

* * * * *